(No Model.) 3 Sheets—Sheet 1.
J. F. QUINN.
SAW SHARPENING AND GUMMING MACHINE.

No. 405,178. Patented June 11, 1889.

Witnesses: Inventor:
E. P. Ellis, Joseph F. Quinn,
M. L. Bassett. per F. A. Lehmann,
Atty.

(No Model.) 3 Sheets—Sheet 2.
J. F. QUINN.
SAW SHARPENING AND GUMMING MACHINE.

No. 405,178. Patented June 11, 1889.

Witnesses:
E. P. Ellis
M. L. Bassett.

Inventor:
Joseph F. Quinn,
per F. A. Lehmann,
Atty.

(No Model.) 3 Sheets—Sheet 3.
J. F. QUINN.
SAW SHARPENING AND GUMMING MACHINE.
No. 405,178. Patented June 11, 1889.
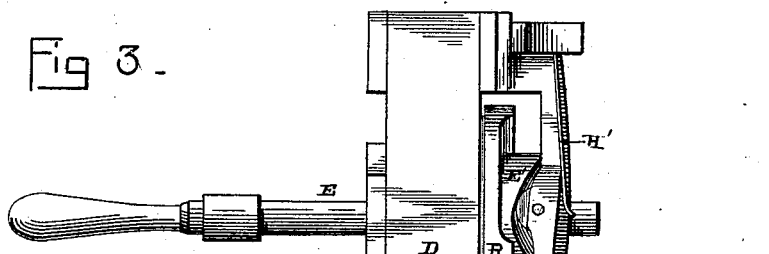
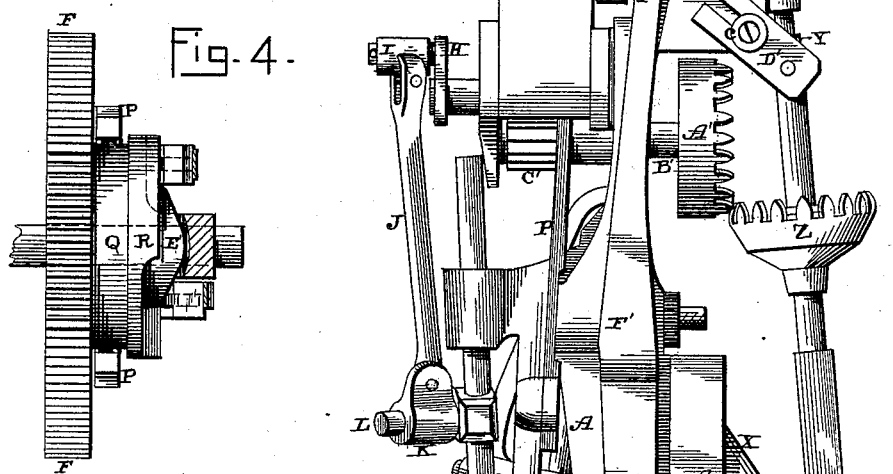
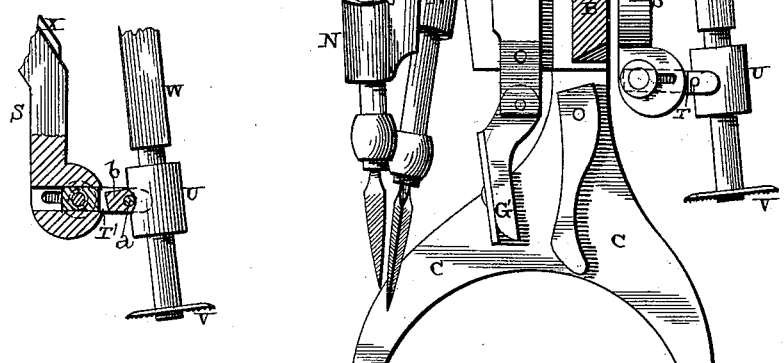
Witnesses:
E. P. Ellis,
M. L. Bassett
Inventor:
Joseph F. Quinn,
per F. A. Lehmann,
Att'y

UNITED STATES PATENT OFFICE.

JOSEPH FINCHER QUINN, OF TREZEVANT, TENNESSEE.

SAW SHARPENING AND GUMMING MACHINE.

SPECIFICATION forming part of Letters Patent No. 405,178, dated June 11, 1889.

Application filed February 15, 1889. Serial No. 300,048. (No model.)

*To all whom it may concern:*

Be it known that I, JOSEPH FINCHER QUINN, of Trezevant, in the county of Carroll and State of Tennessee, have invented certain new and useful Improvements in Combined Saw Filers and Gummers; and I do hereby declare the following to be a full, clear, and exact description of the invention, such as will enable others skilled in the art to which it pertains to make and use it, reference being had to the accompanying drawings, which form part of this specification.

My invention relates to an improvement in combined gin-saw filers and gummers; and it consists in the combination of a mechanism for filing the teeth of the saw with a gumming mechanism, the two mechanisms being connected together so as to operate upon the saws at the same time, as will be more fully described hereinafter.

The object of my invention is to produce a machine which can be applied directly to the saws while in the gin, and which will not only file the teeth but gum them at the same time.

Figures 1, 6:
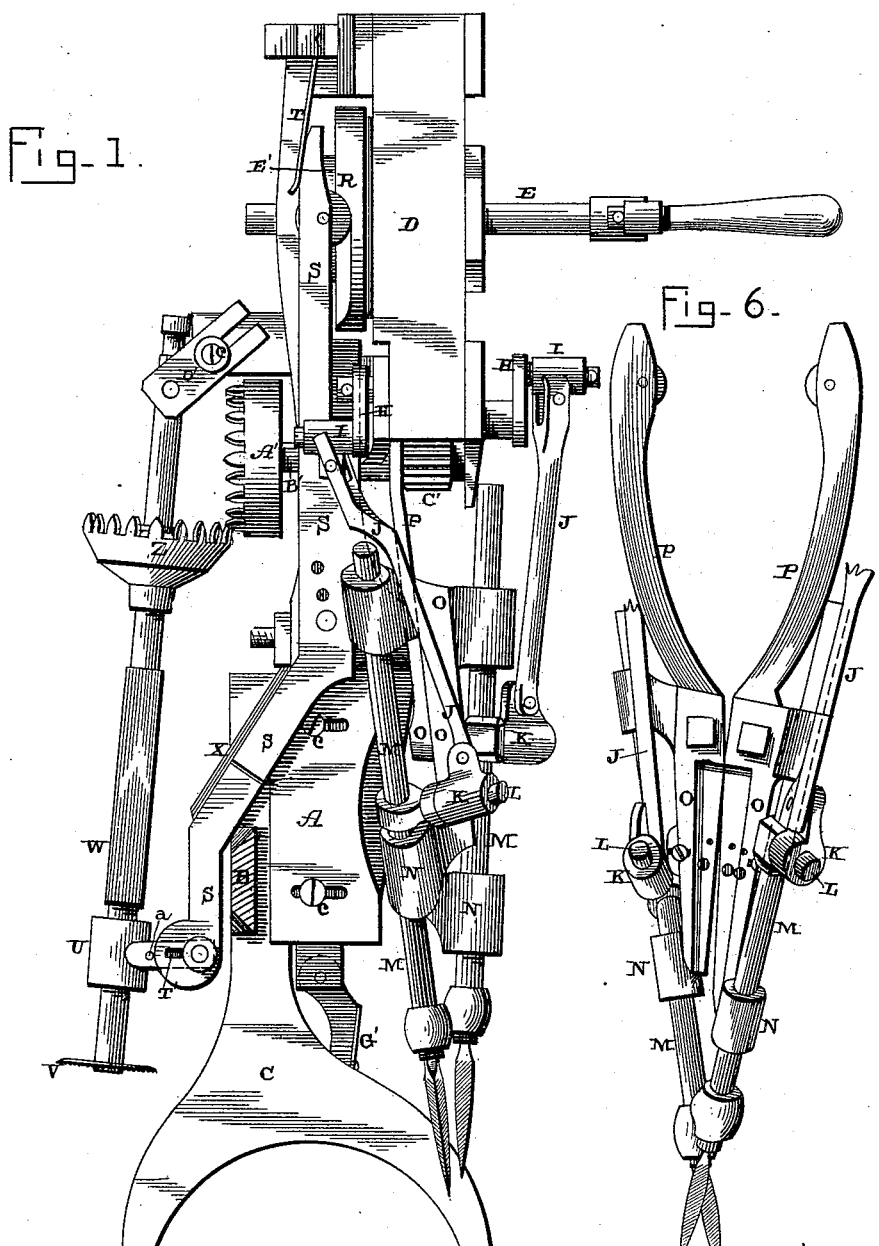
Figure 2:
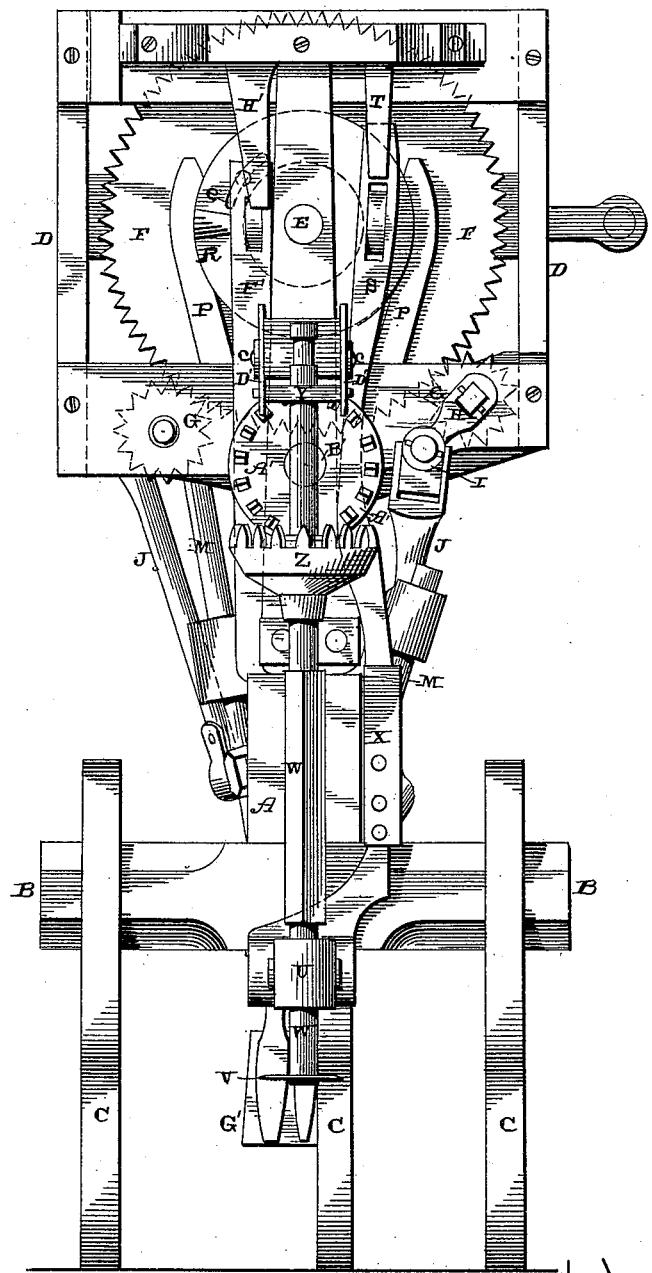

Figures 1, 2, and 3 are vertical elevations of a machine which embodies my invention, taken from opposite sides. Figs. 4, 5, and 6 are detail views.

A represents a suitable standard or frame, which is secured at its lower end to a supporting frame or stand B, which is provided with three supporting-feet C, which are adapted to fit over and rest upon the top of the saw-cylinder, and thus support the machine in position to operate upon the saws while in the gin.

The frame or standard A is adjustably connected to the part B, so that the different operating parts of the machine can be adjusted into any desired relation to the teeth of the saw. The two outer feet or supports C are laterally adjustable upon the part B, so as to adapt them to the distance between the saws. I do not limit myself to any precise manner of adjusting these parts one upon the other, for this may be varied without departing from the spirit of my invention. Slots are here shown through the part B, and through these slots screws are passed into the part A, and these slots are made long enough to give any desired amount of adjustment, so as to bring the operating parts into any desired position. Secured to the upper portion of this frame or standard A is the rectangular frame D, through which passes horizontally the operating-shaft E, which is to be operated by means of a handle or crank, which is applied to one end thereof. Mounted upon this shaft E is the large gear-wheel F, which is preferably provided with ninety teeth, and which meshes with and operates the pinions G, placed in the lower portion of the frame D, as shown. Secured to one end of the shaft of each of these pinions G is a crank H, and upon this crank is placed a box or bearing I, to which a connecting-rod J is pivoted. The box I turns freely upon the crank, and the connecting-rod adjusts itself freely to the position of the box as the crank is made to revolve. The lower end of this connecting-rod J is pivoted to a second box K, which is placed loosely upon the bearing L, which is secured to the file-shaft M. When the wheel F is revolved, the pinions G are also revolved and the cranks H impart to the file-shafts M a reciprocating and partially-revolving motion, so as to cause the files to act upon the teeth of the gin-saw in the usual manner. These shafts M pass through the two bearings N, formed upon opposite ends of the adjustable levers O, which are secured to the lower ends of the rods P, which are provided with friction-rollers at their upper ends, so as to be alternately operated by the cam-wheel Q, which is placed upon the shaft E in close proximity to the wheel F. These rods are pivoted upon the frame A near their lower ends, and together with the levers O, which are secured to their lower ends, give to the file-shafts M a lateral movement. The levers O are provided with slots, as shown, so as to give them a suitable adjustment upon the lower ends of the rods P, and thus vary the amount of lateral movement which shall be given to the files; also rigidly secured to the shaft E is a cam-wheel R, which has two recesses formed in its face, and which recesses operate the lever S, which is pivoted at or near its center upon the frame A. A spring T holds the friction-roller, which is journaled in the upper end of the lever S, in contact with this cam-wheel R and returns the lever to position after having been moved by the raised surfaces upon the cam. This lever S is provided with a series of holes, through which the pivot can be passed and thus vary the amount of motion which shall be given to the lower end of the lever. In the lower end of this lever S is made a suitable socket or opening, and through opposite sides of this socket or opening and through the slots set-screws are passed for the purpose of holding the adjustable block T' in any desired position. Pivoted in this lever S, which is forked at its outer end, is the lower bearing U, through which the gummer-shaft passes. This box U and the block T' are made adjustable, so as to fit the gummer accurately to the teeth and to regulate the cut which the gummer is to have. Projecting from the box U is the extension b, to which the block P' is pivoted at a, so as to allow the block P' a free sliding movement through the opening in the lower end of the lever S. The lever S is given a vibratory movement for the purpose of causing the gummer to engage and disengage from the teeth.

The gummer V is secured to the lower end of the shaft W, and consists of a round wheel or disk, which is beveled upon its upper side from near its center to the edge. The top surface of this gummer is smooth, while the lower edge is roughened, like a file. This gummer engages with the teeth of the saw upon the opposite side of the saw from the files; but both gummer and files operate at the same time upon the same saw. This gummer extends in a plane horizontally across the saw, between two teeth, against the base or throat of the teeth, and its object is to cut out the thin sharp edge of the throat, so as to make the tooth slightly longer and to smooth it. By the operation of the gummer the teeth are left rounded and smooth. In order to allow this gummer the desired amount of vibration, the lever S is jointed near its lower end, and over this joint is placed a spring X, which is sufficiently strong to connect the two parts of the lever together and to allow the lower portion the desired amount of vibration that it is necessary that the gummer should have in coming in contact with the teeth of the saw.

The shaft W is journaled in the box U at its bottom, and is swiveled at Y at its top, and is provided with the crown-wheel Z, which meshes with a similarly-shaped wheel A', placed upon the shaft B', which is provided with a pinion C', which engages with the lower edge of the wheel F. When the machine is set in operation, these wheels A' Z cause the shaft W and the gummer secured to its lower end to revolve. The swivel Y is journaled in suitable bearings D', which are secured to a projection which extends out from the standard or frame A, and which bearings D' are slotted, so that they can be adjusted and thereby regulate the angle at which the shaft W and the gummer shall operate; also secured to the shaft E is a cam E', which operates the feed spring-actuated lever F', which is pivoted or journaled upon the frame A. The spring H' serves to keep the upper end of this lever in contact with its operating-cam. The upper end of this lever is provided with a friction-roller which bears against the surface of the cam E'. To the lower end of this lever is pivoted the dog G', by means of which the saw is moved forward after having been gummed to have its teeth filed.

If so desired, the cam E' R may be formed in a single piece and rigidly secured to the shaft E; but the cam R is made separately and is provided with a slot e, so that it can be adjusted independently of the other. This cam R fits over the one E', as shown.

In using my invention I take off the breast of the gin, the same as for the operation of a saw-filer, and support my machine between the saws by means of the legs C, and if the gummer-shaft comes in contact with the gin-frame it will be necessary to provide a suitable support for the machine to lean against to hold it steady. The filers must be rightly adjusted, and then, by turning the wheel F slowly, observe whether the gummer engages with the teeth of the saw properly. If it does not, loosen the two screws c, which hold the bearings D' in position and slide the shaft W either in or out, as may be desired, and then tighten the screws again, so as to hold the bearings in position. When the friction-roller screwed to the upper end of the lever S mounts the prominence or raised portion upon the cam R, the gummer should bear against the throat of the teeth, and if it does not or should bear too tightly, loosen the two set-screws which pass through opposite sides of the lower end of the lever and move the sliding block T' in or out, as may be desired, and then tighten the screws again. The operating-wheel F is provided with ninety cogs, so as to give the filers a more rapid motion than has been imparted to them heretofore in machines of this class, and so as to enable the filers to file the teeth by going around the saw only once. For every revolution of the wheel F the filers are given a stroke proportioned to the difference between the size of the pinions G and the wheel F, which amounts to about three strokes of the filers to each tooth. The saws are prevented from moving backward by means of a suitable dog or stop of any desired construction.

Having thus described my invention, I claim—

1. The combination of the operating-shaft, a cam R, placed thereon, a spring-actuated lever S, which is operated by the cam, the bearing U, secured to its lower end, the gummer-shaft W, which passes through the bearing and is provided with an operating-wheel Z, and a shaft provided with a wheel A', for meshing with the wheel upon the gummer-shaft, and a pinion C', for meshing with the driving-wheel F, substantially as described.

2. The combination of the operating wheel and shaft, a cam secured to the shaft, a spring-actuated lever S, provided with a socket in its lower end, an adjustable block placed in the socket, a bearing connected to the block, the gummer-shaft having the gummer attached to its lower end, an operating-wheel secured to the shaft, and the shaft B', provided with a wheel for operating the gummer-shaft, and a pinion for receiving motion from the driving-wheel, substantially as described.

3. The combination of an operating shaft and wheel, the spring-actuated lever S, jointed below its pivot and its two parts connected together by a spring X, the bearing for the gummer-shaft connected to the lower end of the lever, the gummer-shaft and the gummer attached to its lower end, and a mechanism for causing the gummer to revolve, substantially as set forth.

4. The combination of the spring-actuated lever S, a cam for operating it, a sliding block connected to the lower end of the lever, a bearing for the gummer-shaft attached to the block, the gummer-shaft and gummer, the wheel secured to the gummer-shaft, and an operating mechanism for causing the shaft to revolve with the swivel Y, and adjustable bearing for the swivel, substantially as specified.

In testimony whereof I affix my signature in presence of two witnesses.

JOSEPH FINCHER QUINN.

Witnesses:
W. A. MARSHALL,
JAS. R. HILLSMAN.